INVENTOR
John W. Riddel
BY
Hugh L. Fisher
ATTORNEY

Sept. 22, 1970   J. W. RIDDEL   3,529,472
FLOAT-OPERATED THERMISTOR TANK LEVEL SENDER
Filed Dec. 5, 1968   2 Sheets-Sheet 2

INVENTOR.
John W. Riddel
BY
Hugh L. Fisher
ATTORNEY

United States Patent Office 3,529,472
Patented Sept. 22, 1970

1

3,529,472
FLOAT-OPERATED THERMISTOR
TANK LEVEL SENDER
John W. Riddel, Fenton, Mich., assignor to General
Motors Corporation, a corporation of Delaware
Filed Dec. 5, 1968, Ser. No. 781,522
Int. Cl. G01f 23/10
U.S. Cl. 73—295
12 Claims

ABSTRACT OF THE DISCLOSURE

A liquid level indicator having a float positioned in a liquid reservoir, a thermistor positioned on the float so as to be immersed in the liquid in direct proportion to the amount of liquid in the reservoir, and an indicating device which senses the amount of the thermistor immersed in the liquid so as to provide an indication of the quantity of liquid in the reservoir.

This invention relates to improvements in liquid level indicators.

Several types of electric liquid level indicators have been employed in many diverse applications, primarily because the readout device can be remote from the liquid reservoir. A typical application is use as a fuel guage in a vehicle where the quantity of fuel in the fuel tank is indicated. Some of these prior art indicators utilize a thermistor as a sensing device and operate on the principle that a thermistor immersed in liquid will assume a different level of conductivity than a similar thermistor not so immersed due to the cooling effect of the liquid. The problems encountered in such indicators include the indicator sensitivity and power consumption.

It is, therefore, an object of this invention to provide a new and different liquid level indicator incorporating a thermistor, which maneuvered in accordance with liquid level to correspondingly have its resistance varied so as to be capable of following continuous liquid level transitions and while consuming a minimum of power.

A more specific object is to provide a thermistor liquid level indicator of continuous liquid level transition following capability which utilizes a heating device to increase its sensitivity but which consumes a minimum of electrical power and which utilizes a float for positioning the thermistor in accordance with the liquid level.

An additional object of this invention is to provide a liquid level indicator utilizing a float-operated sending unit comprised of a single, relatively small thermistor which is capable of continuously following a wide range of liquid level transitions.

The invention is carried out according to the embodiment herein discussed by positioning a float in a liquid reservoir, installing a thermistor on the float so as to immerse the thermistor in the liquid in direct proportion to the amount of liquid in the reservoir, sensing the thermistor resistance, and indicating the liquid level in the reservoir as a measure of the sensed thermistor resistance. The indicator sensitivity may be increased by placing a heating element in close proximity to the thermistor so as to increase the resistance range over which the thermistor is operated.

The foregoing and other objects and advantages of the invention will become apparent from the following description and from the accompanying drawings, in which:

2

Figure 1:
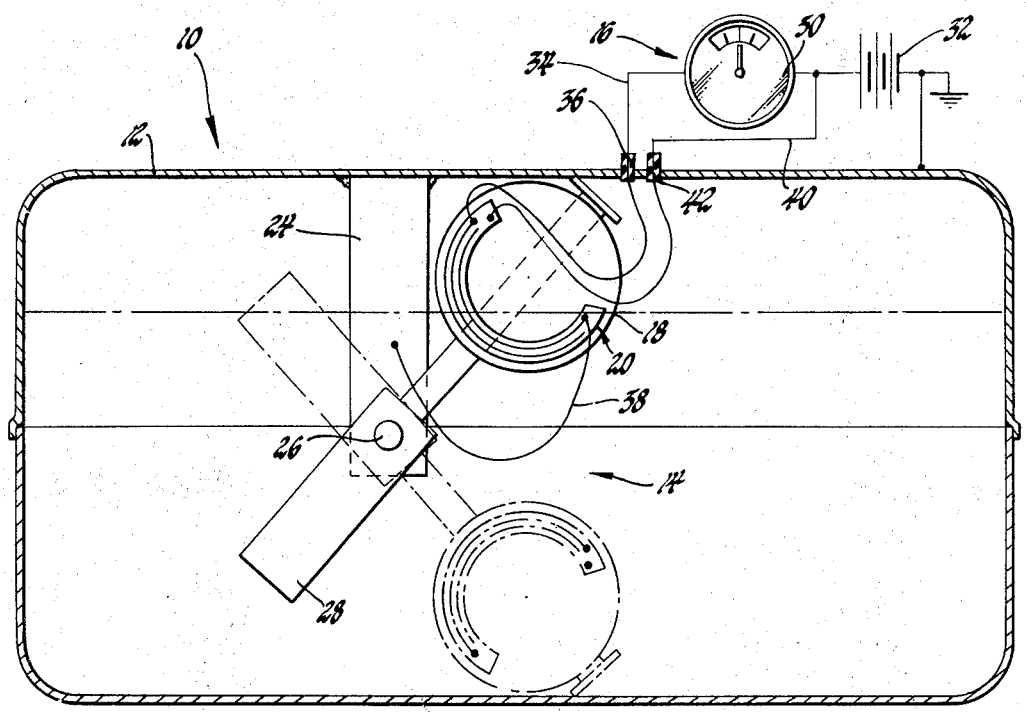
FIG. 1 illustrates schematically an indicator incorporating the principles of the invention.
Figure 2:
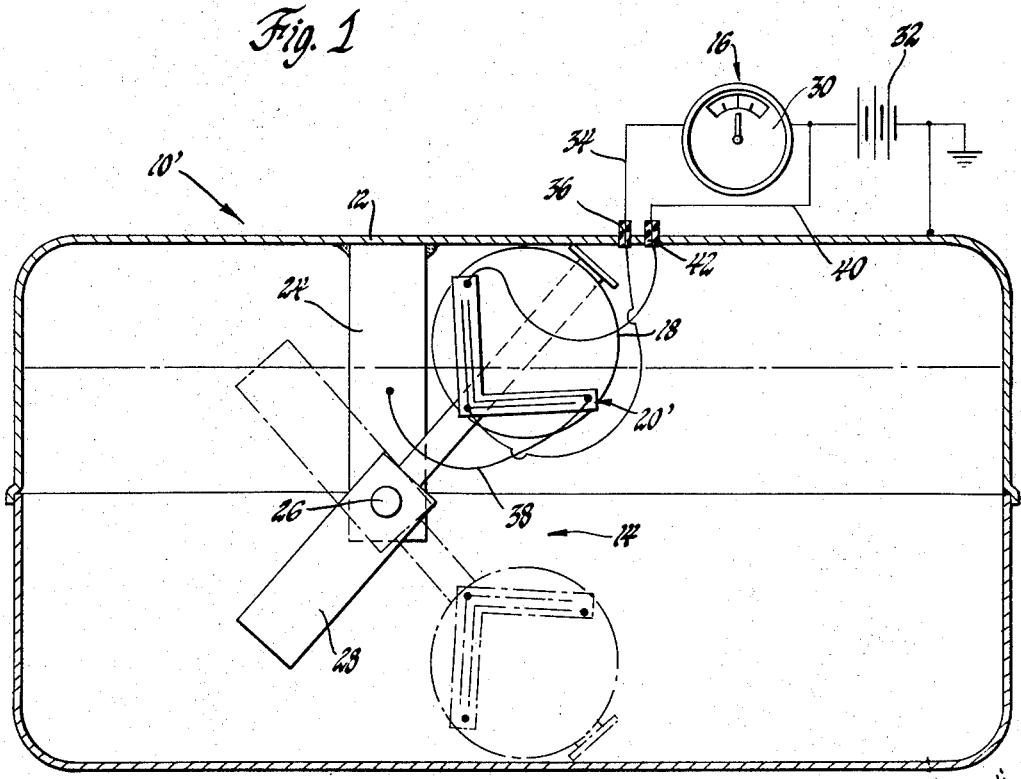
FIG. 2 illustrates the indicator of FIG. 1 incorporating a thermistor of right angular configuration.

As is shown in FIG. 1, a liquid level indicator 10 is provided which utilizes a liquid reservoir 12, a sending unit 14, and a meter circuit 16. In the embodiment herein discussed the indicator 10 is used as a fuel gauge for a vehicle through persons skilled in the art will appreciate that it may be used in other applications.

The sending unit 14 is positioned in the reservoir 12, which is a fuel tank in this embodiment. The sending unit 14 is comprised of a float 18, a thermistor 20 and a resistance heating element 22, the resistance heating element 22 being hidden from view in FIG. 1 by the thermistor 20. In a way to be further described, the resistance of the thermistor 20 varies in accordance with the amount of liquid in the reservoir 12. These resistance variations are sensed by the meter circuit 16, which is calibrated so as to indicate fluid levels in the reservoir 12.

In the illustrated embodiment the float 18 is supported by a bracket 24 at a pivotal mounting 26. The bracket 24 is affixed, as by welding, to the reservoir 12. The float 18 is provided with a counterweight 28, the purpose of which will be explained later. The thermistor 20 is shown in the embodiment of FIG. 1 to be of semicircular configuration and affixed to the float 18 so as to be partially immersed in the liquid in the reservoir 12. The particular method of affixing the thermistor 20 to the float 18 is not critical and, by way of example, may be achieved by use of an appropriate adhesive.

The meter circuit 16 is comprised of a meter 30 and a battery 32. The meter 30 in the illustrated embodiment may be a conventional fuel meter as is presently found in vehicles and calibrated in units of volume. A current path is provided from the battery 32 through the meter 30, a lead 34 which extends through a grommet 36 so as to be insulated from the reservoir 12, the thermistor 20, and a lead 38 to the bracket 24. The bracket 24 is connected to ground through the reservoir 12. A second current path is provided from the battery 32 through a lead 40 which is insulated from the reservoir 12 by a grommet 42, the resistance heating element 22, the lead 38, and the bracket 24.

The operation of the indicator 10 will now be explained. When the liquid in the reservoir 12 is at a very low level, the thermistor 20 is mostly above the liquid. The heating element 22 and the current in the thermistor 20 increase the thermistor 20 temperature. This heating effect on the portion of the thermistor 20 immersed in liquid is negated by the cooling effect of the liquid. At low liquid levels, portrayed by phantom lines in FIG. 1, only a small amount of the thermistor 20 is immersed in the liquid so most of the thermistor 20 assumes a high temperature. Since the thermistor 20 in this embodiment is made of a material having a negative temperature coefficient, it presents a low resistance in series with the meter 30 at low liquid levels. The large current present in the meter 30 at this time causes the meter 30 to indicate that the reservoir 12 is nearly empty.

When the amount of liquid in the reservoir 12 is increased it lifts and rotates the float 18 to the position shown by solid lines so as to increase the immersion of the thermistor 20 in the liquid. The increased immersion of the thermistor 20 produces a corresponding increase in the thermistor 20 resistance due to the cooling effect of the liquid. The current in the meter 30 is thus limited to its smallest value when the thermistor 20 is completely immersed. The meter 30 is calibrated to indicate the reservoir 12 is full when the current therethrough is at a minimum.

Proper readings of the meter 30 through the operating range of the indicator 10 are obtained by maintaining the immersed portion of the thermistor 20 in direct proportion to the liquid level. This may be achieved by proper design and balance of the float 18 and the counterweight 28. The specific gravities and dimensions of the float 18 and the counterweight 28 are selected so as to cause the float 18 to be half immersed in the liquid when the reservoir 12 is half filled with liquid. The thermistor 20 is positioned on the float 18 so as to be half immersed in liquid when the float 18 is half immersed. Thereafter the symmetry of the thermistor 20 will cause it to be immersed in direct proportion to the liquid level.

A different embodiment of the indicator 10 is shown in FIGS. 2 through 5. In this embodiment, the thermistor 20' is formed in a right angle configuration. Due to the right angle configuration symmetry, the thermistor 20' operates in the same fashion as the semicircular thermistor 20. That is, regardless of liquid level in the reservoir 12 the portion of the thermistor 20' immersed in the liquid is in direct proportion to the amount of liquid in the reservoir 12. This is again achieved by the lifting and rotating action of the float 18 under the influence of the liquid.

The structure of the thermistors 20 and 20' is identical and is similar to the thermistor structure described in U.S. application Ser. No. 600,230, now Pat. No. 3,469,224, which was filed Dec. 8, 1966, in the names of Riddel and Schwyn. The thermistor 20' structure is presented in FIGS. 3 through 5.

Figure 4:
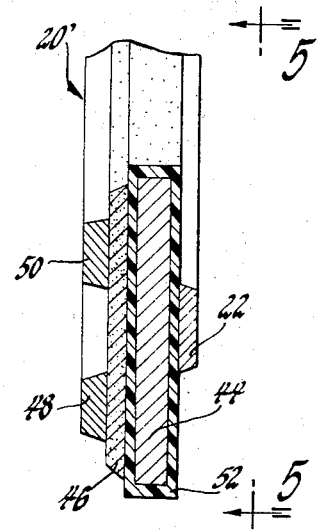
FIG. 4 is a sectional view of the thermistor of FIG. 2 taken along line 4—4 of FIG. 3.

Referring now to FIG. 4, the thermistor 20' is shown to be comprised of a substrate 44, a coating 46 deposited on the substrate 44, a pair of conducting lines 48 and 50 which are deposited on the coating 46 so as to serve as terminals for electrical connections to the coating 46, and the heating element 22. Some of the requirements placed on the substrate 44 are that it is rigid when formed in a slender shape, capable of heat transfer, and an electrical insulator at its surface. Nickel has been found to be quite satisfactory for use as the substrate 44. When using nickel for the substrate 44 a nickel oxide coating 52 is formed on the substrate 44 by an oxidizing process so as to impart electrical insulation properties to the substrate 44.

Figure 6:
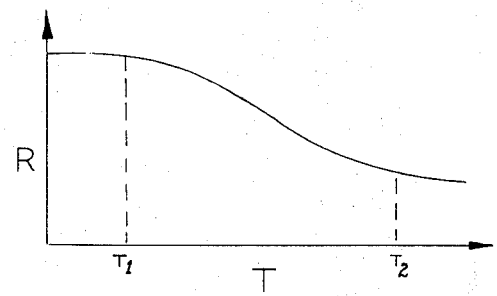
FIG. 6 is a typical characteristic curve of the thermistor material employed.

The coating 46 is comprised of a thermistor material applied to the top surface of the substrate 44. Conventional printed circuit manufacturing techniques, such as silk screening, may be utilized in applying the coating 46 to the substrate 44. The thermistor material used for the coating 46 may have either a positive or negative coefficient of resistance. A negative coefficient of resistance material having the characteristic curve shown in FIG. 6 is used for the coating 46 in the illustrated embodiment. One suitable thermistor material for the coating 46 is comprised of equal molar quantities of manganese oxide, cobalt oxide and zinc oxide. Various other thermistor material compositions may also be used, such as the one just mentioned in which nickel oxide or copper oxide is substituted for the zinc oxide.

In FIG. 6 resistance is plotted vertically and temperature is plotted horizontally. Two temperature levels $T_1$ and $T_2$ are indicated by dotted lines. It is seen that temperatures below $T_1$ and temperatures above $T_2$ do not appreciably affect the thermistor material resistance.

The resistance heating element 22 is deposited on the bottom of the substrate 44 so as to be in heat transferring relationship with the coating 46. The passage of an electrical current through the resistance heating element 22 causes it to heat the coating 46. This heat will increase the temperature of the coating 46 portion which is not immersed in liquid above $T_2$ but the coating 46 portion immersed in liquid will remain at a temperature below $T_1$ due to the cooling effect of the liquid. As those skilled in the art will recognize, other methods of heating the coating 46 may be employed. The resistance heating element 22 has been utilized in the illustrated embodiment because of its compactness and operating efficiency.

When the resistance heating element 22 is energized, the resistance of the coating 46 between the lines 48 and 50 approximates the resistance of the coating 46 portion which is at a temperature above $T_2$. This is because the resistance of the coating 46 at a temperature above $T_2$ is considerably less than when it is at a temperature below $T_1$. As with all resistors, this resistance is dependent upon its length, in this case the length of the thermistor 20' portion not immersed in liquid. Since the resistance of the coating 46 increases as its portion not immersed decreases the resistance of the coating 46 is directly proportional to the length of the coating 46 portion which is immersed in liquid. Other factors which affect the coating 46 resistance, such as its width and thickness, are either constants or may be ignored as their effect is negligible.

Figure 3:
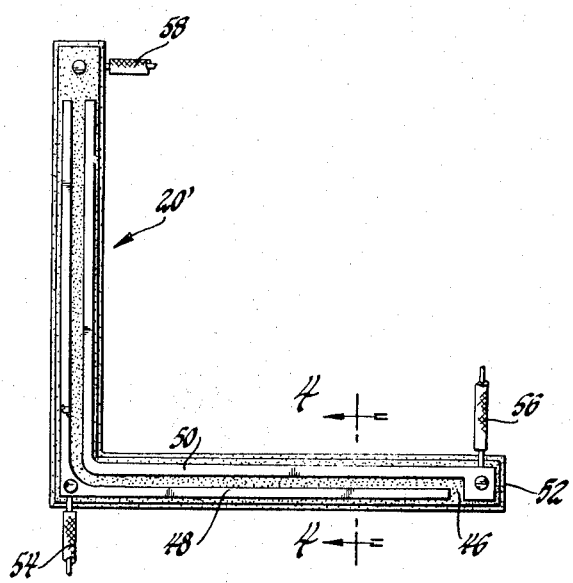
FIG. 3 is an enlarged elevational view of the thermistor utilized in the embodiment of FIG. 2.
Figure 5:
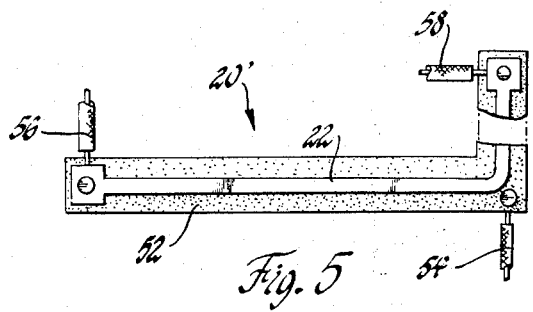
FIG. 5 is an elevational view of the thermistor of FIG. 2, looking in the direction of arrows 5—5 of FIG. 4.

FIGS. 3 and 5 disclose the connections made to the thermistor 20'. The conducting line 48 is connected to the meter 30 at a terminal 54 and the conducting line 50 is grounded at a terminal 56. These connections place the resistance of the coating 46 between the meter 30 and ground. The resistance heating element 22 is energized by connecting it to the battery 32 at a terminal 58 and to ground at the terminal 56.

Figure 7:
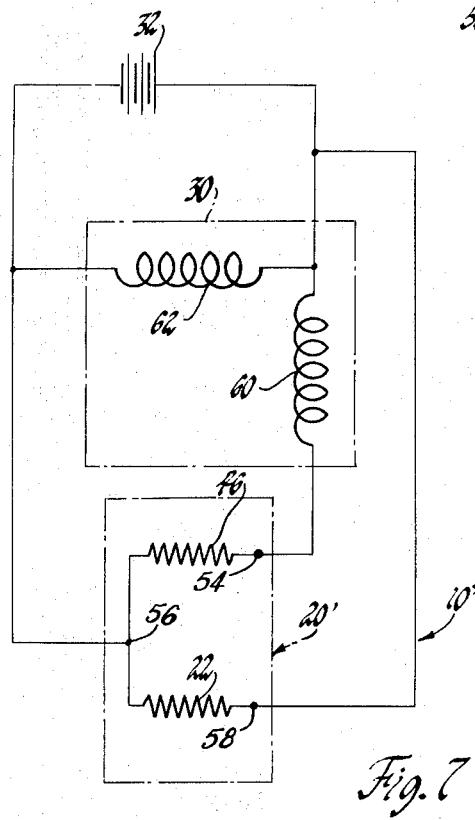
FIG. 7 is a schematic diagram of the circuitry employed by the indicator of FIG. 1.

FIG. 7 illustrates schematically the indicator 10'. The meter 30 is disclosed in this embodiment to be of a type utilizing a pair of coil windings 60 and 62. During operation of the indicator 10' current through the winding 60 in the meter 30, and hence the indication of the meter 30, depends upon the resistance of the coating 46, which is maintained in direct proportion to the liquid level in the reservoir 12 as previously described. It will be appreciated by those skilled in the art that for every liquid level in the reservoir 12 there will be a corresponding degree of immersion of the thermistor 20' and hence a corresponding resistance assumed by the coating 46. Since the meter 30 responds to the resistance of the coating 46 it will directly indicate the liquid level in the reservoir 12 when it is calibrated in terms of liquid volume.

While many variations in this invention will be apparent to those skilled in the art, it is understood that the invention is to be limited only by the following claims.

What is claimed is:

1. In a liquid level indicator, the combination of a reservoir for liquid, float means including a float responsive to the liquid level movably positioned in the reservoir, thermistor means including a thermistor connected to the float so as to be variably immersible in the liquid by the float in accordance with the float elevation, thereby varying the thermistor resistance in accordance with the float elevation and accordingly the liquid level, and indicating means responsive to the thermistor resistance so as to provide an indication of the liquid level in the reservoir.

2. In a liquid level indicator, the combination of a reservoir for liquid, float means including a float responsive to the liquid level positioned in the reservoir, thermistor means including a thermistor installed on the float so as to be variably immersible in the liquid by the float in accordance with the liquid level, the thermistor being immersed in the liquid by the float in proportion to the amount of liquid in the reservoir so as to vary the thermistor resistance in accordance with the quantity of liquid in the reservoir, and indicating means operative in response to the thermistor resistance whereby the thermistor resistance may be utilized to provide an indication of liquid level in the reservoir.

3. In a liquid level indicator, the combination of a reservoir for liquid, float means including a float responsive to the liquid level positioned in the reservoir, thermistor means including a thermistor affixed to the float so as to be variably immersible in the liquid in accordance with the liquid level, thereby varying its temperature and resistance in accordance with the liquid level in the reservoir, and indicating means responsive to the thermistor resistance variations so as to provide an indication of liquid level in the reservoir.

4. In a liquid level indicator, the combination of a reservoir for liquid, float means including a pivotally mounted float positioned in the reservoir so as to be lifted and rotated in response to the liquid level, thermistor means including a thermistor operatively connected to the float so as to be movable therewith and variably immersible in the liquid, the float rotational movements causing the thermistor immersion and resistance to vary in accordance with the liquid level in the reservoir, and indicating means responsive to the thermistor resistance so as to provide an indication of the liquid level in the reservoir.

5. In a liquid level indicator, the combination of a reservoir for liquid, float means including a float responsive to the liquid level positioned in the reservoir, thermistor means including a thermistor installed on the float so as to be variably immersible in the liquid by the float in accordance with the liquid level, thereby varying the thermistor resistance in accordance with the liquid level, a heating device located in heat transferring relationship with the thermistor so as to heat the thermistor, the cooling effect of the liquid preventing substantial increase in temperature of the portion of the thermistor immersed in the liquid, and indicating means operative in response to the thermistor resistance whereby an indication of liquid level in the reservoir may be obtained as a measure of the thermistor resistance.

6. In a liquid level indicator, the combination of a reservoir for liquid; float means including a float responsive to the liquid level positioned in the reservoir; thermstor means including a thermistor installed on the float so as to be variably immersible in the liquid by the float in accordance with the liquid level, thereby varying the thermistor resistance in accordance with the liquid level, the thermistor being comprised of a substrate having top and bottom surfaces, a coating of thermistor material affixed to the substrate top surface, a first contact terminal deposited on the thermistor material coating and extending the length thereof, a second contact terminal deposited on the thermistor material coating and extending the length thereof, and a heater element deposited on the substrate bottom surface and extending the length thereof for heating the thermistor material coating; means for energizing the heater element so as to heat the thermistor material coating, the cooling effect of the liquid preventing substantial heating of the portion of the thermistor material coating immersed in the liquid; and indicating means operative in response to the thermistor material coating resistance whereby the amount of thermistor material coating resistance may be utilized to provide an indication of liquid level in the reservoir.

7. In a liquid level indicator, the combination of a reservoir for liquid, float means including a float responsive to the liquid level positioned in the reservoir, thermistor means including level positioned in the reservoir, thermistor means including a thermistor of semicircular configuration installed on the float so as to be variably immersible in the liquid by the float in accordance with the liquid level, thereby varying the thermistor resistance in accordance with the liquid level, and indicating means operative in response to the thermistor resistance whereby the thermistor resistance may be utilized to provide an indication of liquid level in the reservoir.

8. In a liquid level indicator, the combination of a reservoir for liquid; float means including a float responsive to the liquid level positioned in the reservoir; thermistor means including a thermistor of semicircular configuration installed on the float so as to be variably immersible in the liquid by the float in accordance with the liquid level, thereby varying the thermistor resistance in accordance with the liquid level, the thermistor being comprised of a substrate having top and bottom surfaces, a coating of thermistor material affixed to the substrate top surface, a first contact terminal deposited on the thermistor material coating and extending the length thereof, a second contact terminal depositde on the thermistor material coating and extending the length thereof, and a heater element deposited on the substrate bottom surface and extending the length thereof for heating the thermistor material coating; means for energizing the heater element so as to heat the thermistor material coating, the cooling effect of the liquid preventing substantial heating of the portion of the thermistor material coating immersed in the liquid; and indicating means operative in response to the thermistor material coating resistance whereby the amount of thermistor material coating resistance may be utilized to provide an indication of liquid level in the reservoir.

9. In a liquid level indicator, the combination of a reservoir for liquid, float means including a float responsive to the liquid level positioned in the reservoir, thermistor means including a thermistor of semicircular configuration installed on the float so as to be variably immersible in the liquid by the float in accordance with the liquid level, thereby varying the thermistor resistance in accordance with the liquid level, a heating device located in heat transferring relationship with the thermistor so as to heat the thermistor, the cooling effect of the liquid preventing substantial heating of the portion of the thermistor immersed in the liquid, and indicating means operative in response to the thermistor resistance whereby an indication of liquid level in the reservoir may be obtained as a measure of the thermistor resistance.

10. Means for indicating liquid level in a reservoir comprising, in combination, liquid level responsive means responsive to the liquid level in the reservoir including a float adapted to float on the liquid and means for connecting the float to the reservoir, thermistor means for modulating an electric signal as a function of the depth of the immersion of the thermistor means in the liquid, and means for connecting the thermistor means to the liquid level responsive means so that the depth of immersion of the thermistor means varies in accordance with the liquid level in the reservoir.

11. Means for indicating liquid level in a reservoir comprising, in combination, liquid level responsive means responsive to the liquid level in the reservoir including a float adapted to float on the liquid and means for connecting the float to the reservoir, thermistor means for modulating an electric signal as a function of the depth of the immersion of the thermistor means in the liquid, the thermistor means including a thermistor incorporating a substrate having top and bottom surfaces, a coating of thermistor material affixed to the substrate top surface, a first contact terminal deposited on the thermistor material coating and extending the length thereof, a second contact terminal deposited on the thermistor material coating and extending the length thereof, and a heater element deposited on the substrate bottom surface and extending the length thereof for heating the thermistor material coating, means for energizing the heater element so as to heat the thermistor material coating, the cooling effect of the liquid preventing substantial heating of the portion of the thermistor material coating immersed in the liquid and means for connecting the thermistor means to the liquid level responsive means so that the depth of immersion of the thermistor means varies in accordance with the liquid level in the reservoir.

12. Means for indicating liquid level in a reservoir comprising, in combination, liquid level responsive means responsive to the liquid level in the reservoir including a float adapted to float on the liquid and means for connecting the float to the reservoir, thermistor means for modulating an electric signal as a function of the depth of the immersion of the thermistor means in the liquid, a heating device located in heat transferring relationship with the thermistor so as to heat the thermistor, the cooling effect of the liquid preventing substantial increase in temperature of the portion of the thermistor means immersed in the liquid, and means for connecting the thermistor means to the liquid level responsive means so that the depth of immersion of the thermistor means varies in accordance with the liquid level in the reservoir.

References Cited

UNITED STATES PATENTS

| | | | |
|---|---|---|---|
| 1,819,849 | 8/1931 | Stearns | 338—33 |
| 1,988,192 | 1/1935 | Drabin | 338—33 X |
| 2,669,123 | 2/1954 | Ballard | 73—317 |
| 3,205,709 | 9/1965 | Gearing et al. | 73—295 |
| 3,324,722 | 6/1967 | Reicks | 73—295 |
| 3,363,466 | 1/1968 | Guidi | 73—295 |
| 3,441,892 | 4/1969 | Luedeman | 338—23 |

FOREIGN PATENTS 618,966  3/1949  Great Britain.

S. CLEMENT SWISHER, Primary Examiner

D. M. YASICH, Assistant Examiner

U.S. Cl. X.R.

73—313, 317